Figure 1:
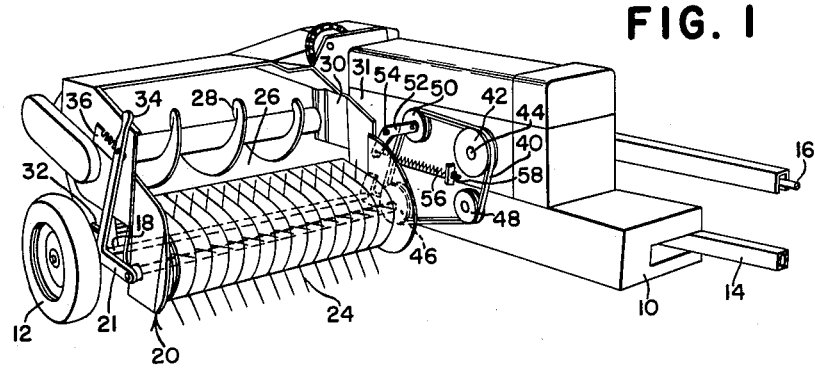

July 26, 1966  L. G. CHEATUM  3,262,330

BALER PICK-UP DRIVE AND COUNTERBALANCE

Filed June 18, 1964

INVENTOR.
LEO G. CHEATUM

United States Patent Office 3,262,330
Patented July 26, 1966

3,262,330
BALER PICK-UP DRIVE AND COUNTERBALANCE
Leo G. Cheatum, Ottumwa, Iowa, assignor to Deere & Company, Moline, Ill., a corporation of Delaware
Filed June 18, 1964, Ser. No. 376,075
9 Claims. (Cl. 74—227)

This invention relates to agricultural implements and more particularly to improved means for counterbalancing a baler pick-up or the like and controlling the belt tension on the pick-up drive means.

A typical baler is drawn by a tractor over a field of cut and windrowed crops and includes pick-up means which picks up the crops and delivers them to conveyor means which feeds the crops into a baling chamber. Since the pick-up means must operate close to the ground, it has been found desirable to mount it so that it is free to move vertically relative to the ground and the main frame of the baler, the pick-up being supported at a predetermined adjustable height for movement closely adjacent to the ground. The vertical freedom of movement allows the pick-up to give vertically when striking a foreign object such as a rock or a mound of earth. The vertical flexibility of the pick-up also facilitates transport of the baler, the pick-up being locked a substantial distance from the ground while the baler is being transported. To reduce the amount of force necessary to raise the pick-up, counterbalance means, such as springs, has been utilized so that a small upward force will overcome the weight of the pick-up.

The pick-up is generally powered by a power source located on or transmitted through the main frame of the baler. The power is transmitted to the pick-up through drive means, which for the purpose of illustrating the present invention will be described as a belt drive wherein the drive sheave is located on the main frame of the baler and the driven sheave is located on the pick-up. Since the pick-up is movable vertically relative to the main frame of the baler, the relative positions of the drive sheave and the driven sheave change. It is therefore necessary that a movable biased idler be provided in the drive means to maintain belt tension.

The vertical component of the belt tension exerts a lifting force on the driven sheave on the pick-up, affecting the net weight of the pick-up, since it is free to move vertically. Thus a change in the belt tension necessitates adjustment in the counterbalance spring setting to provide optimum counterbalance.

Conversely, change of the counterbalance spring may affect the belt tension. Moreover, a change in the height of the pick-up changes the idler bias, which consequently changes the belt tension, requiring additional adjustments in counterbalance and belt tension springs.

The present invention overcomes these objectionable features by utilizing just one spring to provide both the idler bias for proper belt tension and the pick-up counterbalance at relatively constant values, regardless of the height setting of the pick-up. This is accomplished by the strategic configuration of the drive means and the proper location and direction of the idler biasing spring.

Accordingly an object of the present invention is to provide improved means for counterbalancing a baler pick-up or the like. Another object is to provide improved drive means. Another object is to both counterbalance the pick-up and provide biasing means to maintain proper tension in the drive means by utilizing a single spring. A further object is to provide means for maintaining relatively constant belt tension in the drive means using a spring regardless of the extension of the spring. Another object is to provide an easily adjustable spring for both counterbalancing a pick-up and maintaining belt tension in the pick-up drive. Still another object is to provide a baler pick-up counterbalance and drive means of simple but rugged construction, inexpensive to manufacture and easy to maintain.

These and other objects of the invention will become apparent from a consideration of the detailed drawings and description which follow wherein an embodiment of the present invention is disclosed.

Figure 2:
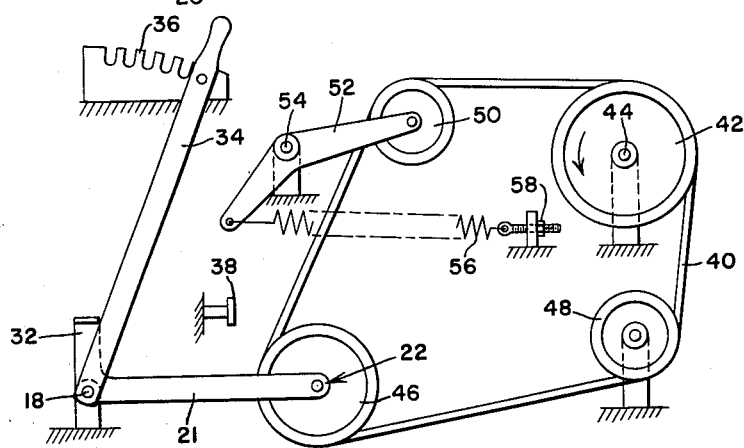
Figure 3:
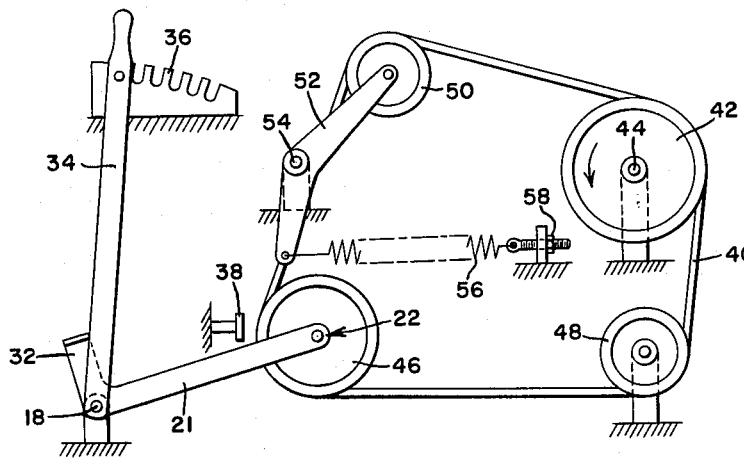

In the drawings:
FIG. 1 is a front perspective of a representative baler embodying the present invention.
FIG. 2 is a schematic representation of the baler pick-up and drive means with the pick-up in normal operating position.
FIG. 3 is a schematic representation of the baler pick-up and drive means with the pick-up in raised position.

Referring now to the drawings, the baler chosen for illustration comprises a mobile main frame 10 carried on a left wheel 12 and a right wheel (not shown) for advance over a field of cut and windrowed crops. The baler is pulled by a tractor connected to a tongue 14 which is joined to the main frame. Power is also derived from the tractor power take-off and transmitted to the baler through a power shaft 16, which is connected to a baler transmission (not shown).

The main frame includes a pivot 18 which extends horizontally and transversely to the direction of machine travel. A typical pick-up 20 has two parallel frame members 21 rockably mounted on and extending forwardly from the pivot 18. The other ends of the pick-up members journal a pick-up shaft 22 which carries pick-up means 24 for picking up the crops and delivering them upwardly and rearwardly to a deck 26, from which they are fed by an auger 28 through an opening 30 into the baling chamber 31.

Since the pick-up members 21 are rockable on the pivot 18, the pick-up means is free to move in an arc around the pivot. In operation the pick-up is supported in an approximately horizontal position by a support arm 32 which forms an integral part of one of the members 21 and seats against a lever 34 which has its lower end rockably mounted on the pivot 18 and its other end selectively positionable by locking means 36 carried by the main frame. Thus, while the pick-up is still free to rock upwardly around the pivot 18, its downward travel is limited by selectively locking the lever 34 in the desired position.

The upward travel of the pick-up is also limited by a stop 38, which projects into the path of the pick-up members. Thus the movement of the pick-up around the pivot is limited to a substantially vertical arc between its supported position and the stop 38.

The pick-up means 24 is driven by a belt drive comprising a belt 40, a drive sheave 42, which is driven by a drive shaft 44 rotating in the main frame 10 in the direction indicated by the arrows in FIGS. 2 and 3 and being powered through the baler transmission, and a driven sheave 46 which is mounted on the pick-up shaft 22. A fixed idler 48 mounted on the frame 10 is located in the tight side of the belt in approximately the same horizontal plane as the pivot 18. Since the pick-up members 21 are generally supported in a horizontal position, the belt between the fixed idler and the driven sheave is also substantially horizontal, and the force exerted by the tight side belt tension on the pick-up is substantially horizontal and has no substantial vertical component which would tend to rock the pick-up around the pivot 18.

A movable idler 50 is located in the slack side of the belt, being journaled at one end of a lever 52 which rocks about a pivot 54 affixed to the frame 10. A spring 56 is attached to the opposite end of the lever 52 and biases the movable idler against the belt. The spring tension is variable through spring adjustment means 58. It is apparent that slack side belt tension depends on the amount of torque applied to the lever 52 around the pivot 54 by the spring 56, and that said torque depends on the amount of tangential force exerted by the spring. When the pick-up is operating in its lowest operating position, as shown in FIG. 2, the spring extension is the greatest, generating the largest amount of spring tension. However, the spring is so located that the force has both radial and tangential components in this position. When the pick-up is raised to a higher position, as shown in FIG. 3, the lever 52 rocks around the pivot 54, reducing the amount of spring extension and consequently the force exerted by the spring. However, the torque-exerting tangential component of the spring force comprises a larger proportion of the total spring force, resulting in a relatively constant torque. Consequently, slack side belt tension is relatively constant regardless of the height of the pick-up.

The weight of the pick-up 20 creates a gravitational force which exerts a torque on the members 21 around the pivot 18, said torque being exerted in a clockwise direction in FIGS. 2 and 3. To achieve desired counterbalance, it is necessary that additional force be exerted on the pick-up to produce a torque in a counterclockwise direction, slightly less than the clockwise torque. It is desirable that the counterbalancing torque remain slightly less than the torque exerted by the weight of the pick-up, regardless of the position of the pick-up, in order that the pick-up may be safely operated in any operating position and will always return to its supported position. The counterbalancing torque is applied solely by the belt tension in the drive means, primarily by the slack side tension since the fixed idler 48 is so positioned that the tight side belt tension primarily exerts a radial force on the members 21. As is apparent from FIGS. 2 and 3, the pivot 54 is so located relative to the pick-up that slack side belt tension exerts an upward, substantially tangential force on members 21, creating a counterclockwise torque around pivot 18, the direction of said force remaining substantially the same regardless of the position of the pick-up between its lowest supported position, as in FIG. 2, and its position against stop 38, since the members 21 and the lever 52 both rotate around their respective pivots in the same direction.

Thus, since both belt tension and the direction of the force exerted by the belt tension remain relatively constant regardless of the position of the pick-up, the pick-up counterbalance remains relatively constant. Therefore, after the initial adjustment of the spring 56 through the adjusting means 58, to achieve proper pick-up counterbalance, the pick-up will remain correctly counterbalanced, and the belt tension will remain constant for any operating position of the pick-up.

Other features and advantages of the present invention will readily occur to those skilled in the art, as will many modifications and alterations in the preferred embodiment of the invention, all without departing from the spirit and scope of the present invention.

What is claimed is:

1. A machine belt drive comprising: a drive sheave rotating about a fixed horizontal axis, a substantially horizontal member movable in a substantially vertical arc about a fixed pivot parallel to the drive sheave axis, a driven sheave rotating on an axis carried by said member parallel to said drive sheave axis, a first idler rotating about a fixed axis spaced below said drive sheave axis parallel to and in substantially the same horizontal plane as said driven sheave axis, a lever arm movable about a fixed pivot which is parallel to and spaced above said driven sheave axis, a second idler sheave rotating about an axis carried by said lever arm parallel to and spaced above said driven sheave axis, a continuous belt successively engaging the driven sheave, the first idler, the drive sheave, and the second idler, adjustable spring means applied to said lever arm for variably biasing the second idler against said belt, the second idler moving in a substantially vertical arc about the lever pivot following the vertical arc movement of the member about its pivot, said spring exerting a greater force on the lever partly in a radial direction toward the lever pivot when the member is supported in its lower position, and exerting a lesser force in a more tangential direction as said member raises.

2. In an agricultural machine having a mobile frame having a power source, a working member carried by the frame for movement in a vertical arc about a substantially horizontal pivot extending transversely to the direction of machine travel and wielding a drivable part rotating on a shaft parallel to and forwardly spaced from said pivot, and vertically adjustable support means for limiting the downward movement of said working member about its pivot, improved drive means for rotating said drivable part and counterbalancing the working member comprising a driven sheave carried by the working member shaft, a drive sheave rotated by said power source about an axis parallel to and spaced on the frame forwardly and upwardly from the driven sheave axis, a first idler sheave rotating about an axis spaced on the frame parallel to and downwardly from the drive sheave axis and forwardly from the driven sheave axis, a lever movable about a pivot affixed to the frame, a second idler sheave rotating about an axis carried by the lever parallel to and upwardly from the driven sheave axis, a continuous belt moving successively about the driven sheave, the first idler, the drive sheave, and the second idler, and means for biasing the second idler against the belt to provide tension in said belt which exerts an upward force on the driven sheave tending to raise the working member about its pivot, partly counterbalancing the weight of the working member.

3. The invention claimed in claim 2 in which the driven sheave rotates about an axis parallel to and forwardly spaced from said working member pivot.

4. The invention claimed in claim 3 in which said means for biasing the second idler against the belt includes at least one spring operably acting on said lever.

5. The invention claimed in claim 4 in which the lever pivot is spaced on the frame parallel to and rearwardly from the drive sheave axis and upwardly from the driven sheave axis.

6. The invention claimed in claim 5 in which the second idler moves about the lever pivot following the motion of the driven sheave about the working member pivot.

7. In an agricultural machine having a mobile frame having a power source, a working member carried by the frame for movement in a vertical arc about a substantially horizontal pivot extending transversely to the direction of machine travel and wielding a drivable part rotating on a shaft parallel to and forwardly spaced from said pivot, and vertically adjustable support means for limiting the downward movement of said working member about its pivot, improved drive means for rotating said drivable part comprising a driven sheave coaxially affixed to the shaft of the rotating part, a drive sheave rotated by said power source about an axis parallel to and spaced on the frame forwardly and upwardly from the driven sheave axis, a first idler sheave rotating about an axis spaced on the frame parallel to and downwardly from the drive sheave axis and forwardly from the driven sheave axis, a lever movable about a pivot spaced on the frame parallel to and rearwardly from the drive sheave axis and upwardly from the driven sheave axis, a second idler rotating about an axis carried by said lever parallel to and between the lever pivot and the drive sheave axis, and upwardly from the driven sheave axis, a continuous belt moving about the driven sheave horizontally to the first idler, then upwardly around the drive sheave, then substantially horizontally to the second idler, then vertically downward to the driven sheave, a spring having one end adjustably affixed to the frame and the other end affixed to the lever adjustably biasing the second idler against the belt, the second idler moving in a substantially vertical arc about the lever pivot following the vertical arc movement of the working member about its pivot, said spring exerting a greater force on the lever partly in a radial direction when the working member is supported in its lower position and exerting a lesser force in a more tangential direction as said working member raises.

8. In an agricultural machine having a mobile frame having a power source, a working member carried by the frame for movement in a vertical arc about a substantially horizontal pivot extending transversely to the direction of machine travel and wielding a drivable part rotating about a shaft parallel to and forwardly spaced from said pivot, and vertically adjustable support means for limiting the downward movement of said working member about its pivot, improved drive means for rotating said drivable part comprising, a driven sheave operably connected to the rotatable part for driving said part and axially parallel to the working member pivot, a drive sheave rotated by said power source about an axis parallel to and spaced on the frame forwardly and upwardly from the driven sheave axis, a first idler sheave rotating about an axis spaced on the frame parallel to and downwardly from the drive sheave axis and forwardly from the driven sheave axis, a lever movable about a pivot spaced on the frame parallel to and rearwardly from the drive sheave axis and upwardly from the driven sheave axis, a second idler sheave rotating about an axis carried by said lever parallel to and between the lever pivot and the drive sheave axis and upwardly from the driven sheave axis, a continuous belt moving successively about the driven sheave, the first idler sheave, the drive sheave, and second idler sheave, and a spring means acting on the lever and biasing the second idler sheave against the belt to provide tension in said belt, the second idler moving about the lever pivot following the vertical arc movement of the driven sheave about the working member pivot, said belt tension exerting an upward force on the working member through the driven sheave tending to raise the working member about its pivot and partly counterbalancing the weight of the working member.

9. In an agricultural machine having a mobile frame having a power source, a working member carried by the frame for movement in a vertical arc about a substantially horizontal pivot extending transversely to the direction of machine travel and including a drivable part rotating on a shaft parallel to and forwardly spaced from said pivot and vertically adjustable support means for limiting the downward movement of said working member about its pivot, improved drive means for rotating said drivable part comprising a driven sheave carried by the working member axially parallel to the working member pivot and operably connected to said drivable part for rotating said part, a drive sheave rotated by said power source about an axis spaced forwardly from the driven sheave axis, a lever arm movable about a pivot fixed on said frame, an idler sheave rotating about an axis carried by said lever arm parallel to and upwardly from the driven sheave, a continuous belt trained around said sheaves, and spring means acting on said lever arm and biasing the idler against the belt to provide tension in said belt, said belt tension exerting an upward force on the driven sheave, tending to raise the working member about its pivot and partly counterbalancing the weight of the working member.

References Cited by the Examiner
UNITED STATES PATENTS

| | | | |
|---|---|---|---|
| 847,379 | 3/1907 | Smiley | 74—227 X |
| 1,391,290 | 9/1921 | Welffens | 74—242.11 X |
| 1,766,586 | 6/1930 | Banfield et al. | 74—242.1 X |
| 2,066,615 | 1/1937 | Everett | 74—242.11 X |
| 2,110,439 | 3/1938 | Gordon | 74—242.11 |
| 2,588,880 | 3/1952 | Richards | 74—242.11 X |
| 2,650,505 | 9/1953 | Vannatta | 74—217 |
| 2,718,108 | 9/1955 | Schmidt | 74—242.8 X |

FOREIGN PATENTS

| | | |
|---|---|---|
| 832,527 | 2/1952 | Germany. |

DAVID J. WILLIAMOWSKY, *Primary Examiner.*
DON A. WAITE, *Examiner.*
J. A. WONG, *Assistant Examiner.*